(12) United States Patent
Pavan et al.

(10) Patent No.: US 6,801,943 B1
(45) Date of Patent: Oct. 5, 2004

(54) NETWORK SCHEDULER FOR REAL TIME APPLICATIONS

(75) Inventors: Allalaghatta Pavan, Roseville, MN (US); Deepak R. Kenchammana-Hosekote, Sunnyvale, CA (US); Nemmara R. Vaidyanthan, Irvine, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/302,592

(22) Filed: Apr. 30, 1999

(51) Int. Cl.[7] ............................................. G06F 13/00
(52) U.S. Cl. ...................... 709/226; 718/103; 719/314; 719/321
(58) Field of Search ................................ 709/202, 205, 709/223, 224, 226; 719/313, 314, 315, 316, 317, 319, 320, 321; 718/102, 103, 104, 105, 107

(56) References Cited

U.S. PATENT DOCUMENTS

| | | | | |
|---|---|---|---|---|
| 5,109,515 A | * | 4/1992 | Laggis et al. | |
| 5,732,087 A | * | 3/1998 | Lauer et al. | 370/416 |
| 5,812,844 A | * | 9/1998 | Jones et al. | 709/104 |
| 5,946,487 A | * | 8/1999 | Dangelo | 395/705 |
| 5,991,790 A | * | 11/1999 | Shah et al. | 709/100 |
| 6,065,037 A | * | 5/2000 | Hitz et al. | 709/200 |
| 6,076,174 A | * | 6/2000 | Freund | 714/47 |
| 6,157,955 A | * | 12/2000 | Narad et al. | 709/228 |
| 6,223,204 B1 | * | 4/2001 | Tucker | 709/103 |
| 6,289,369 B1 | * | 9/2001 | Sundaresan | 709/103 |
| 6,418,460 B1 | * | 7/2002 | Bitar et al. | 709/108 |
| 6,587,865 B1 | * | 7/2003 | Kimbrel et al. | 709/104 |

FOREIGN PATENT DOCUMENTS

EP 0554615 A 8/1993

OTHER PUBLICATIONS

Abbott, R.K., et al., "Scheduling I/O Requests with Deadlines: a Performance Evaluation", *IEEE*, pp. 113–124, (1990).

Arvind, K., et al., "A Local Area Network Architecture for Communication in Distributed Real–Time Systems,", *The Journal of Real–Time Systems*, 3(2), pp. 115–147, (May. 1991).

Biyabani, S.R., et al., "The Integration of Deadline Criticalness in Hard Real–Time Scheduling", *Proceedings: Real–Time Systems Symposium*, Huntsville, Albama, pp. 152–160, (1988).

Boyer, P.E., et al., "A reservation principle with applications to the ATM traffic control", *Computer Networks and ISDN Systems*, 24, North–Holland, pp. 321–334, (1992).

Chipalkatti, R., et al., "Scheduling Policies for Real–Time and Non–Real–Time Traffic in a Statistical Multiplexer", *IEEE Infocom, The Conference on Computer Communications*, pp. 774–783, (1989).

(List continued on next page.)

Primary Examiner—Viet D. Vu
(74) Attorney, Agent, or Firm—Schwegman, Lundberg, Woessner & Kluth, P.A.

(57) ABSTRACT

A network scheduler for real time applications is described. The network scheduler supports scheduling of network packets in a multi-threaded operating system to insure correct scheduling order and to preclude kernel preemption of active threads. The network scheduler resides between a kernel (and device drivers) and multiple sessions at the user-level. The network scheduler uses input/output control primitives such as HOLD and RELEASE to control servicing of the queues of packets at the kernel or network device driver. The control primitives serve as a middleware interface to the underlying kernel or network device driver. The network scheduler functions as a proxy scheduler to manage the queues of packets at the kernel or network device driver.

5 Claims, 6 Drawing Sheets

OTHER PUBLICATIONS

Chung, J., et al., "Algorithms for Scheduling Periodic Jobs to Minimize Average Error", *Proceedings: Real–Time Systems, Symposium,* Huntsville, Alabama, pp. 142–151, (1988).

Chung, J., et al., "Scheduling Periodic Jobs that Allow Imprecise Results,", *IEEE Transactions on Computers, 39(9),* pp. 1156–1174, (Sep. 1990).

Clark, D.D., et al., "Supporting Real–Time Applications in an Integrated Servies Packet Network: Architecture and Mechanism", *Computer Communications Review, 22(4),* pp. 14–26, (Oct. 1992).

Coulson, G., et al., "Protocol Support for Distributed Multimedia Applications", *Network and Operating System Support for Digital Audio and Video,* Heidelberg, Germany, pp. 45–56, (1991).

Ferrari, D., "Client Requirements for Real–Time Communication Services", *IEEE Communications Magazine, 28 (11),* pp. 65–72, (Nov. 1990).

Ferrari, D., et al., "A Scheme for Real–Time Channel Establishment in Wide–Area Networks", *IEEE Journal of Selected Areas in Communications, 8(3),* pp. 368–379, (Apr. 1990).

Gallassi, G., et al., "ATM: Bandwith Assignment and Bandwidth Enforcement Policies", *IEEE Global Telecommunications Conference and Exhibition,* Dallas, Texas, pp. 1788–1793, (1989).

Guha, A., et al., "Controlling the Process with Distrubuted Multimedia", *IEEE Mulimedia, 2(2),* pp. 20–29, (1995).

Guha, A., et al., "Real–Time Support of Continuous and Variable Bit Rate Traffic on ATM Network", *Proceedings of the 14th International Conference on Distributed Computing Systems,* Poznan, Poland, pp. 268–275, (Jun. 1994).

Guha, A., et al., "Supporting Real–Time and Multimedia Applications on the Mecuri Testbed", *IEEE Journal of Selected Areas in Communications, 13(4),* pp. 749–763, (May. 1995).

Hong, J., et al., "A Performance Analysis of Minimum Laxity and Earliest Deadline Scheduling in a Real–Time System", *IEEE Transactions on Computers, 38(12),* pp. 1736–1744, (Dec. 1988).

Hui, J., "Resource Allocation for Broadband Networks", *IEEE Journal of Selected Areas in Communications, 6(9),* pp. 1598–1608, (1988).

Hyman, "Real–Time Scheduling with Quality of Service Constraints", *IEEE Journal on Selected Areas in Communication, 9(7),* pp. 1052–1063, (Sep. 1991).

Jabbari, B., "A Bandwidth Allocation Technique for High Speed Networks", *Globecom IEEE Global Telecommunications Conference and Exhibition,* San Diego, California, pp. 355–359, (1990).

Jensen, E.D., et al., "A Time–Driven Scheduling Model for Real–Time Operating Systems", *IEEE, Proceedings: Real–Time Systems, Symposium,* San Diego, California, pp. 112–122, (1985).

Liu, C.L., "Scheduling Algorithms for Multiprogramming in a Hard–Real–Time Environment", *Journal of the Association for Computing Machinery, 20(1),* pp. 46–61, (1973).

Malcolm, N., et al., "Version Selection Schemes for Hard Real–Time Communications", *Proceedings of the Real–Time Systems Symposium,* San Antonio, Texas, pp. 12–21, (1991).

Parekh, A., et al., "A Generalized Processor Sharing Approach to Flow Control in Integrated Services Networks", Technical Report LIDS–TR–2089, Laboratory for Information and Decision Systems, MIT, pp. 2–163, (1992).

Pavan, A., et al., "Experimental Evaluation of Real–Time Support on the Mercuri Wide Area ATM Testbed", *Proceedings of the 20th Conference on Local Computer Networks,* pp. 82–91, (1995).

Stewart, D.B., et al., "Real–Time Scheduling of Sensor–Bases Control Systems,", *Real Time Programming, Proceedings of the IFAC/IFIP Workshop,* Atlanta, Georgia, pp. 139–143, (1991).

Tsang, R.P., et al., "Experiments with Video Transmission over an Asynchronous Transfer Mode (ATM) network", *Multimedia Systems, 4,* pp. 157–171, (1996).

Turner, J.S., "Managing Bandwidth in ATM Networks with Bursty Traffic", *IEEE Network,* pp. 50–58, (Sep. 1992).

Zhao, W., et al., "A Window Protocol for Transmission of Time–Contrained Messages", *IEEE Transactions on Computers, 39(9),* pp. 1186–1203, (Sep. 1990).

Zhao, W., et al., "Preemptive Scheduling Under Time and Resource Constraints", *IEEE Transactions on Computers, C–36(8),* pp. 949–960, (Aug. 1987).

Zhao, W., et al., "Scheduling Tasks with Resource Requirements in Hard Real–Time Systems", *IEEE Transactions on Software Engineering, SE–13(5),* pp. 564–577, (1987).

Zhao, W., et al., "Simple and Integrated Heuristic Algorithms for Scheduling Tasks with Time and Resource Constraints", *The Journal of Systems, and Software, 7,* pp. 195–205, (1987).

Zhu, W., et al., "Adaptive Threshold–based Scheduling for Real–Time and Non–Real–Time Traffic", *Proceedings of the Real–Time Systems, Symposium,* Phoenix, Arizona, pp. 125–135, (1995).

Tokuda H et al.: "Real–Time Mach: Towards Apredictable Real–Time System" Usenix Workshop Proceedings, Mach, Burlington, Vt., USA Oct. 4–5, 1990, 'Online! pp. 73–82 XP002152622 1990, Berkeley, CA, USA, Usenix, USA Retrieved from the Internet: URL:ftp://mach.cs.cmu.edu/doc/published/RTM.ps 'retrieved on Nov. 10, 2000!.

Smith K A: "Scheduling in Real Time for Unix Operating Systems" Computer Technology Review, US, Westworld Production Co. Los Angeles, vol. 9, No. 16, 1990, pp. 16–17, XP000096004 ISSN: 0278–9647 Whole Document.

Tokuda H et al: "Implementation of a Time–Driven Scheduler for Real–Time Operating Systems" Proceedings of the Real Time Systems Symposium, US, Washington, IEEE Comp. Soc. Press vol. Symp 8, Dec. 1, 1987 (Dec. 1, 1987), pp. 271–280 XP000014293.

"Deadline Monotonic Server" IBM Technical Disclosure Bulletin, US, IBM, Corp. NY vol. 38, No. 9, Sep. 1, 1995 (Sep. 1, 1995), pp. 563–565, XP000540367 ISSN: 0018–8689 Whole Document.

Eun S et al: "Nonpreemptive Scheduling Algorithms for Multimedia Communication in Local Area Networks" Proceedings of the Intl. Conf. on Network Protocols, Nov. 7, 1995 (Nov. 7, 1995), XP000575153 p. 356, Figure 1.

"Mechanism For Priority Traffic Handling on Single–Queue Network Adapters", IBM Technical Disclosure Bulletin, US, IBM Corp. New York, vol. 37, No. 12, Dec. 1, 1994 (Dec. 1, 1994) pp. 643–644, XP000487926, ISSN: 0018–8689.

Straathof J. H. et al: "Unix Scheduling For Large Systems" Usenix Technical Conf. Winter 1986, Jul. 1986 (Jul. 1986), pp. 111–139, XP002152623 Denver, Co., USA, p. 115 Para. 3, p. 116 Para 2, p. 129 Para 5, p. 132 Para 1.

Wendorf J W: "Implementation and Evaluation of a Time–Driven Scheduling Processor" Proceedings of the Real Time System Symposium, US, Washington, IEEE Comp. Soc. Press. vol. Symp. 9, Dec. 6, 1988 (Dec. 6, 1988) pp. 172–180, XP000014037 Abstract, p. 173 Left–Hand Column, Para 3, p. 175 Left–Hand Column Para 4.

Schwan K et al: "High Performance Operating System Primitives for Robotics and Real–Time Control Systems," ACM Transaction on Computer Systems, US, Association for Computing Machinery, NY, vol. 5, No. 3, Aug. 1, 1987) (Aug. 1, 1987), pp. 189–231; XP000054316, ISSN: 0734–2071, p. 198–201, p. 209 Last Para, p. 210 Last Para.

* cited by examiner

US 6,801,943 B1

NETWORK SCHEDULER FOR REAL TIME APPLICATIONS

STATEMENT OF GOVERNMENT INTEREST

This invention was made with Government support under contract number F19628-94-C-0044 awarded by Advanced Research Projects Agency (ARPA)/CSTO. The Government has certain rights in the invention.

FIELD OF THE INVENTION

The present invention relates generally to real time applications and more specifically to a network scheduler for such applications.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1998, 1999 Honeywell, Inc., All Rights Reserved.

BACKGROUND OF THE INVENTION

Real time systems comprise programs that must execute relative to priorities or within strict constraints on response time. Some examples of real-time systems include industrial plant controllers, medical monitors, communications networks, and aircraft or spacecraft flight control systems. One difficulty in designing real-time systems is in the strict requirement to meet processing deadlines and not in the actual speed of processing. A real-time system need not be complex or high performance. Checking radioactivity levels in a nuclear power plant or checking a pulse rate on a medical patient may require only simple processing. However, a failure to meet a processing deadline, such as decreasing plant power or sounding a medical alarm, can be literally fatal.

One example of a real time system is a multimedia system. Multimedia is increasingly recognized as an enabling technology with diverse applications from interactive training to medical diagnosis to control applications, for example. In the context of control applications, the term "multimedia" implies a much broader scope than the traditional usage of the term that refers to audio, video and text. In the context of control applications, multimedia encompasses both the traditional multimedia data as well as image data and spectral data. Image data refers to still images, full-motion video, and graphics. Image data is obtained from sources such as video, X-ray, and scanning electron microscopy to name a few. Spectral data refers to sensor data. Spectral data is obtained from sources such as infrared, color, acoustic emission, ultrasound, microwave, laser, and optical sensors and devices, for example.

A multimedia-based control system imposes stringent requirements on a network. A key network requirement for multimedia-based control systems is that the underlying network must support real time tasks. Performance criteria for a network in such a control system are very different than those of a typical information network. Some basic performance criteria for a control network are (1) the guarantee of critical traffic, (2) the avoidance of priority inversion, and (3) the guarantee of deadlines. Priority inversion occurs when a lower priority task is allocated the resources before a higher priority task.

When scheduling real time tasks in a network, a priority or a deadline is associated with the task. For many real time tasks, failure to meet the deadline or failure to avoid priority inversion is considered a system fault. The priority or the deadline associated with a task is commonly specified globally at the user or application level. However, a kernel-level scheduling mechanism does not allow users or applications to exercise control over scheduling policies. As a result, user or application-level scheduling policies fail when kernel-level scheduling cannot enforce the same policy.

For these and other reasons, there is a need for a mechanism to guarantee correct scheduling order of real time tasks according to the user or application specified priorities or deadlines.

SUMMARY OF THE INVENTION

A network scheduler for real time applications is described. According to one aspect of the invention, a network scheduler acts as a proxy scheduler across different scheduling domains for the purpose of achieving correct deadline and priority based scheduling of network packets. An application specifies real time requirements in terms of deadlines or periodicities. An appropriate scheduling algorithm is applied based on the application task periodicities and deadlines. Simple primitives excercise control over operating system threads over scheduling domains to control their suspension and execution. The scheduling mechanism functions as a middleware system.

Another aspect of the invention is a scheduling method for an application distributed across a plurality of processing nodes. The scheduling method comprises a proxy scheduling mechanism at every node between the boundaries of a plurality of scheduling domains within a processing node. The scheduling method achieves overall end to end deadline and priority based scheduling for distributed real time applications running over a plurality of processing nodes with multiple scheduling domains.

The present invention is applicable to a variety of operating system platforms and middleware solutions for real time systems. The present invention allows user-level defined attributes, such as priorities and deadlines, and desirably overcomes constraints resulting from vendor specific operating system mechanisms that do not preserve such user specified attributes of real time behavior. The primitives of the invention allow various scheduling policies such as priority based or deadline based scheduling policies.

Still other and further embodiments, aspects and advantages of the invention will become apparent by reference to the drawings and by reading the following detailed description.

DESCRIPTION OF THE EMBODIMENTS

In the following detailed description of the embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present inventions. The following detailed description is, therefore, not to be taken in a limiting sense, and the scope of the present invention is defined only by the appended claims.

Introduction. A network scheduler according to the present invention is implemented with a multithreaded operating system having different priority domains for user-level threads and kernel-level threads. A kernel-level scheduling mechanism generally does not allow users to exercise control over scheduling policies. Thus, user level scheduling policies may fail if the kernel-level scheduling cannot enforce the same policy. The network scheduler solves these and other scheduling problems in a multithreaded operating system having different methods of scheduling threads within a user-level domain and a kernel-level domain. For example, in some multithreaded operating systems a priority based scheduling policy or a deadline based scheduling policy is used at the user level and a round-robin based scheduling policy is used at the kernel level. In such an example, the network scheduler desirably prevents the kernel-level scheduling order from preempting the user-level scheduling order. As a result, the network scheduler, as further described below, guarantees correct scheduling order according to the user specified priorities or deadlines.

The detailed description of this invention is divided into three sections. The first section provides a system level overview of an example embodiment of the present invention. The second section describes methods of scheduling network communication packets according to an example embodiment of the invention. The third section describes a computing system in conjunction with which embodiments of the present invention are implemented.

Figure 1:
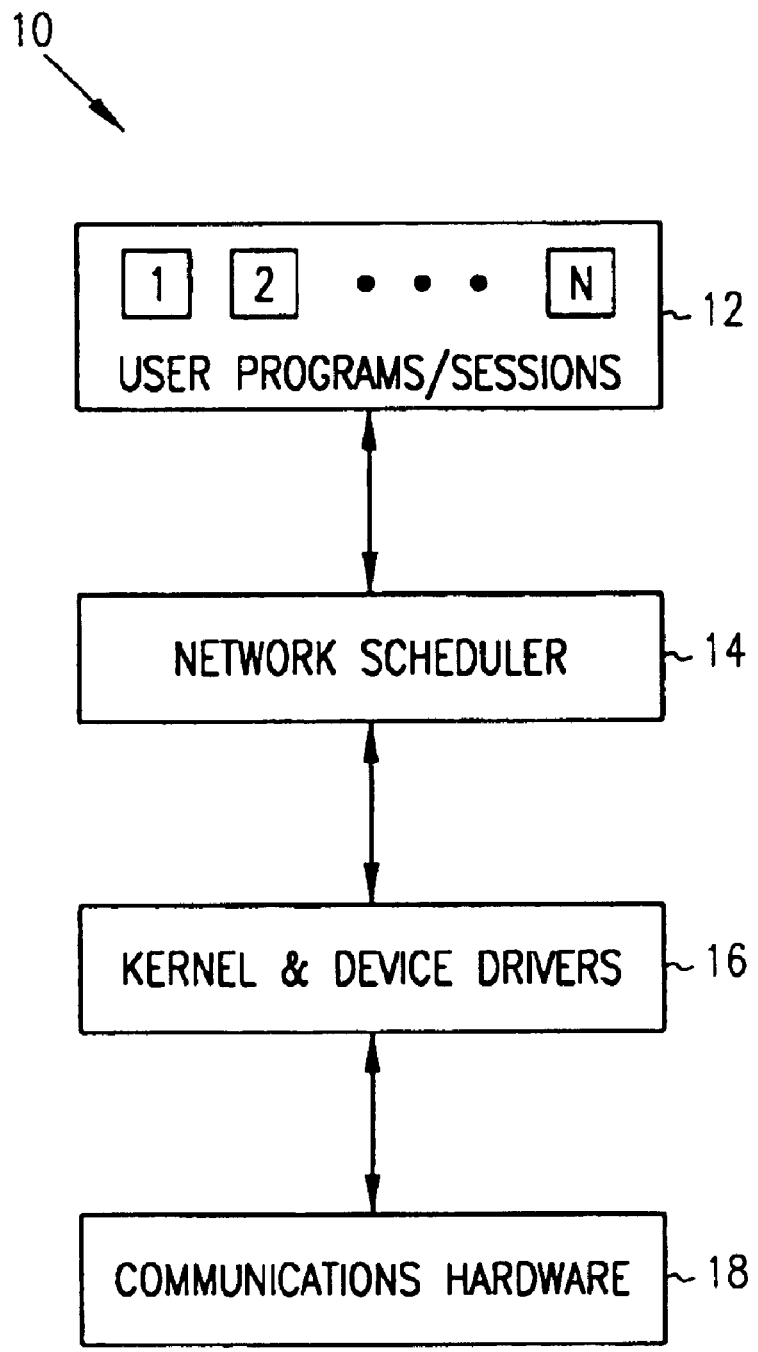
FIG. 1 is a block diagram illustrating a system level overview of an example embodiment of the invention.

System Overview. A system level overview of an example embodiment of the invention is described by reference to FIG. 1. The network scheduling system 10, as shown in FIG. 1, comprises one or more user-level sessions 12, a network scheduler 14, a kernel and device drivers 16 and communications hardware 18 including one or more physical communication channels.

The user-level sessions 12 have one or more user-level threads. Each thread is a different stream of control that can execute its instructions independently, allowing a multithreaded process to perform numerous tasks concurrently. Each one of the user-level threads is assigned a scheduling constraint based on the requirements of the real time application with which the user-level thread is associated. In one embodiment, the scheduling constraint is a priority. The priority is assigned using any common priority based scheduling policies. Two well known examples of priority based scheduling policies are Rate Monotonic Analysis and Deadline Monotonic Analysis. In an alternate embodiment, the scheduling constraint is a deadline. A common example of a deadline based scheduling policy is an Earliest Deadline First policy.

The network scheduler 14 schedules the use of a shared resource such as a physical communication channel. The network scheduler 14 receives a scheduling constraint for a user-level thread and manages the scheduling of the corresponding kernel-level thread based on the scheduling constraint of the user-level thread. The network scheduler ensures that kernel or device drivers 16 schedule the network packets in a manner that meets the scheduling constraint assigned by the user-level session 12. In one embodiment, the network scheduler uses instructions (referred to herein as "primitives") to perform the following functions: hold a queue of packets, release a queue of packets, check the population of a queue, check a deadline of a packet at the head of a queue, and check the priority of a packet at the head of a queue. An example method of scheduling based on priorities is further described with respect to FIG. 2. An example of scheduling based on deadlines is further described with respect to FIG. 3.

The kernel 16 (or any comparable center of an operating system) generally releases network communication packets according to a predetermined scheme. One example of a common scheme for kernel level scheduling is a round-robin scheme in which available communication packets are released in a cyclic manner. However, such a kernel-level scheduling policy may not enforce the scheduling constraints specified at the user-level session 12. The network scheduler 14 of the present invention solves this problem using the primitives described above to enforce the user specified scheduling constraints at the kernel and device driver level.

The device driver 16 maintains a queue of packets waiting to access the physical communication channel. The network scheduler 14 ensures that these packets are released from the queue according to the user specified scheduling constraints. In one embodiment, the network scheduler 14 is used to schedule the use of one or more physical communication channels between network components in a circuit switched network.

The process of determining which thread to allow to send packets over a network channel is referred to herein as "scheduling." Scheduling for real time applications, such as multimedia applications, must be done within defined constraints or else the system may fail. In previous systems, the operating system controlled the scheduling of packets on the physical communication channel, but in a system according to the present invention the network scheduler is implemented in middleware and the network scheduler directly controls scheduling of packets using methods which are further described below. The example embodiment described below is directed to the use of the network scheduler to schedule network communication packets. However, one of skill in the art will recognize that the network scheduler can be adapted to schedule the use of other shared hardware or software resources.

Figure 2:
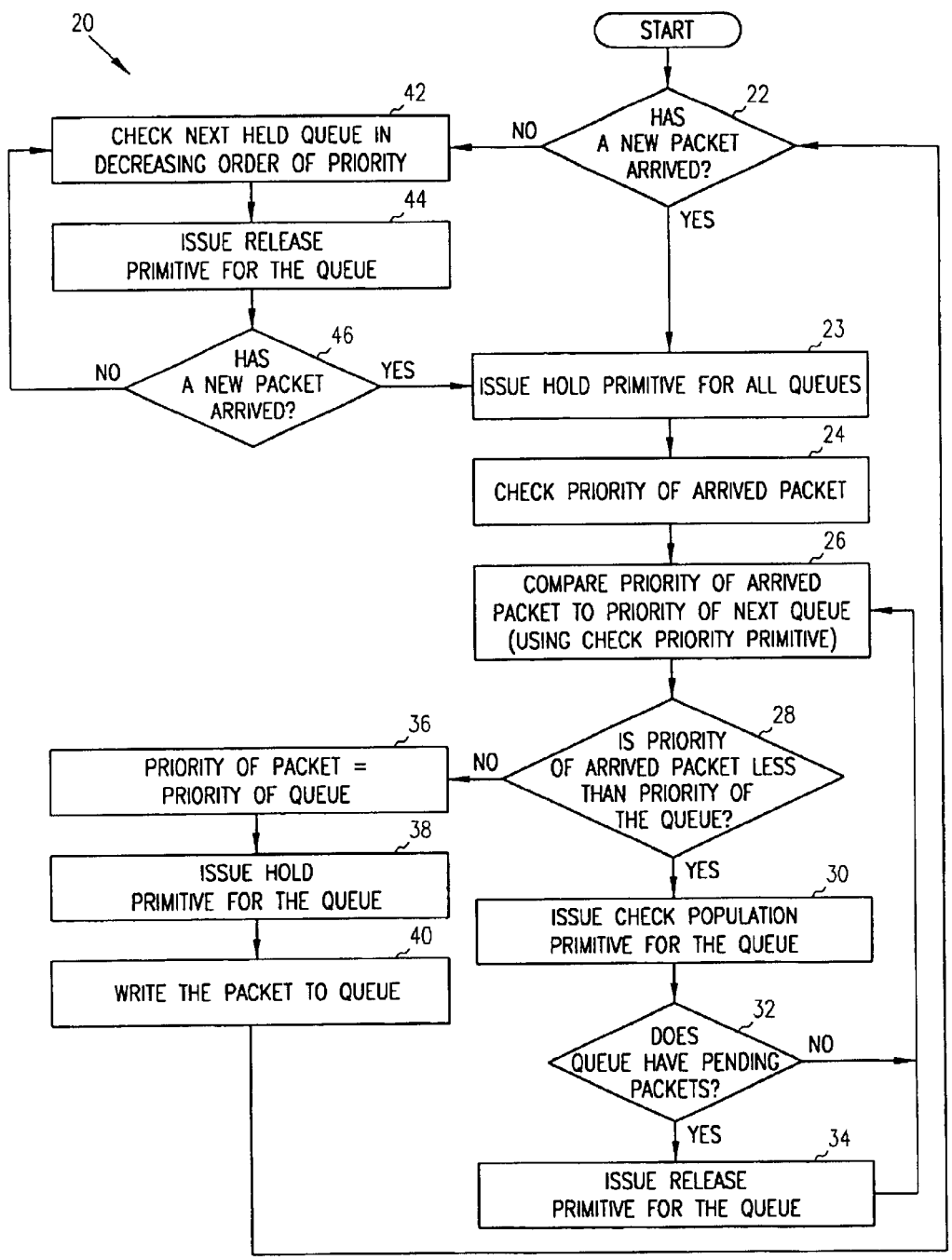
FIG. 2 is a flowchart of an example embodiment of a method of performing priority based scheduling.
Figure 3:
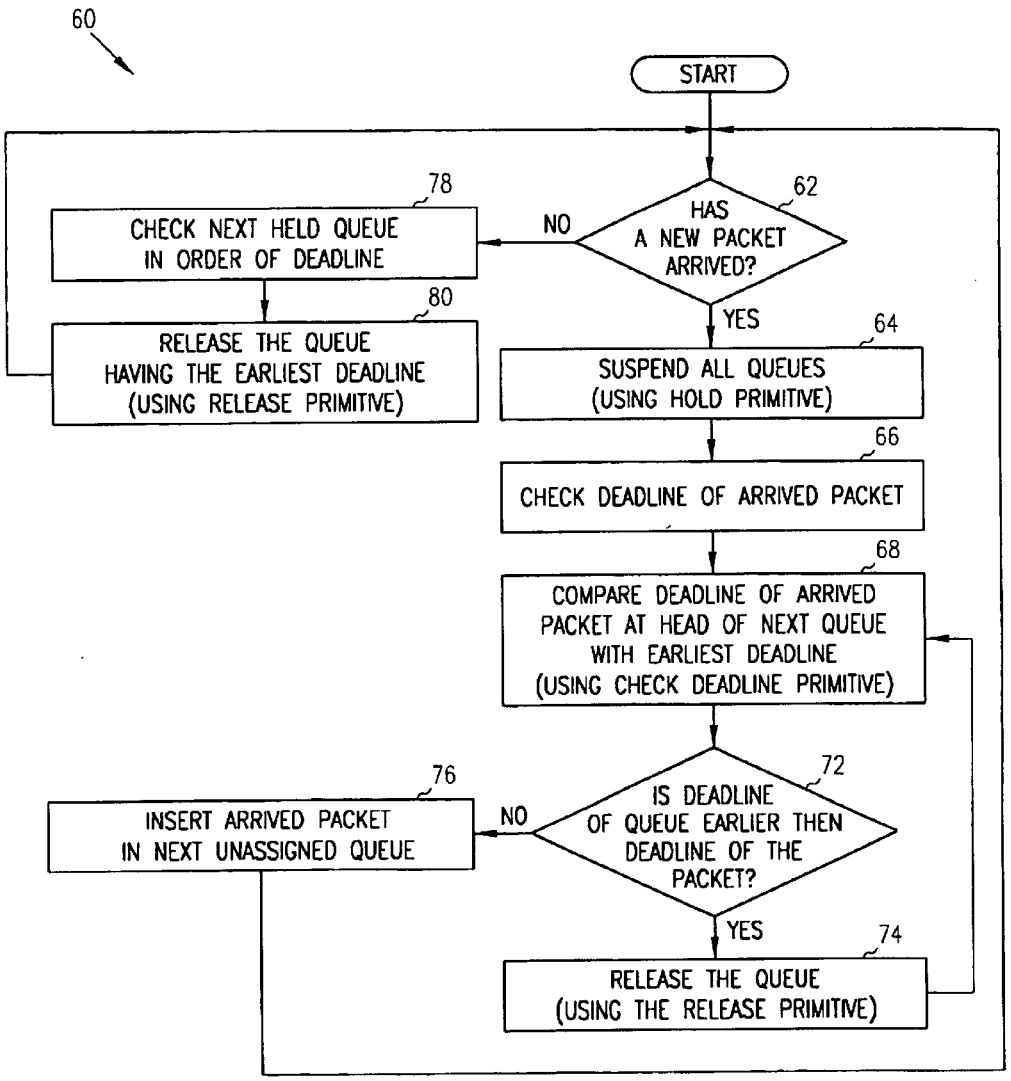
FIG. 3 is a flowchart of an example embodiment of a method of performing deadline based scheduling.

Methods of the Invention. Referring now to FIGS. 2 and 3 a particular method performed by a processor in an exemplary embodiment is described by reference to a series of flowcharts. The methods to be performed constitute computer programs made up of computer-executable instructions. The methods shown in FIGS. 2 and 3 are implemented in a machine readable medium comprising machine readable instructions for causing a computer to perform the method. Such machine readable medium may include software modules and computer programs. The type of computer programming languages used to write the code may vary from procedural code type languages to object oriented languages. The files or objects need not have a one to one correspondence to the modules or method acts described depending on the desires of the programmer. Further, the method and apparatus may comprise combinations of software, hardware and firmware as is well known to those skilled in the art. Describing the methods by reference to flowcharts enables one skilled in the art to develop such programs including such instructions to carry out the methods on suitable computerized systems.

FIG. 2 is a block diagram of an example embodiment of a method of performing priority based scheduling. In one embodiment, the network scheduler 14 of FIG. 1 acts as a proxy scheduler for the kernel by performing the method shown in FIG. 2. Using the method shown in FIG. 2, the network scheduler 14 uses a HOLD, a RELEASE, a CHECK PRIORITY and a CHECK POPULATION primitive or the like to control the behavior of the kernel-level scheduler and to ensure that the user-level scheduling requirements are met.

In the embodiment of a priority based scheduling method 20 shown in FIG. 2, a network scheduler checks for the arrival of a new packet for transmission on a network connection (block 22). Upon the arrival of a new packet, the network scheduler issues a HOLD primitive to hold all of the network connection queues (block 23). The HOLD primitive holds the connection queues while the priority of the packet is checked. The network scheduler checks the priority assigned to the arrived packet at the user level (block 24). If no priority is assigned to the arrived packet, the packet is assigned to a general queue. In addition to checking the priority of the arrived packet, the priority of the arrived packet is compared to a priority level of a highest priority queue (block 26.) If the priority of the arrived packet is less than the priority of the queue (block 28), then the network scheduler issues a CHECK POPULATION primitive to determine if the queue has packets pending (block 30.) If the queue is populated with pending packets (block 32), a RELEASE primitive is issued by the network scheduler to release the packet(s) in the queue (block 34.) The network scheduler releases the queue at block 34 because the queue has a user specified priority that is a higher priority than the user specified priority of the arrived packet. After the queue is released, the priority level of the arrived packet is compared with the priority level of the next highest level priority queue (block 26.) The actions in blocks 26, 28, 30, 32, and 34 are repeated until the priority level of the packet is not less than the priority level of the queue.

If the priority level of the arrived packet is not less than the priority level of the queue, then the priority level of the arrived packet is equal to the priority level of the queue (block 36.) The network scheduler issues a HOLD primitive for the queue that has a priority level equal to the arrived packet's priority level (block 38.) The arrived packet is assigned to the queue with the same priority level (block 40) and then the network scheduler checks for the arrival of another new packet (block 22.) If no new packets have arrived (block 22), then the queues are checked beginning with the highest priority level queue (block 42). The network scheduler issues a RELEASE primitive for the queue (block 44). After releasing the queue, the network scheduler checks for the arrival of a new packet (block 46.) If a new packet has not arrived, the queue with the next highest level priority is checked (block 42) and the actions in blocks 42, 44, and 46 are repeated until a new packet arrives.

An example embodiment of a method of performing priority based scheduling has been described by reference to FIG. 2. In an alternate embodiment, the network scheduler 14 of FIG. 1 acts as a proxy scheduler for the kernel by performing the method shown in FIG. 3.

FIG. 3 is a block diagram of an example embodiment of a method of performing deadline based scheduling. Using the method shown in FIG. 3, the network scheduler 14 uses the HOLD, RELEASE, CHECK POPULATION and CHECK DEADLINE primitives to control the behavior of the kernel-level scheduler and to ensure that the deadline based user-level scheduling requirements are met.

The deadline based scheduling method 60 shown in FIG. 3, checks for the arrival of a new packet for transmission on a network connection (block 62). Upon the arrival of a new packet, the network scheduler issues a HOLD primitive to hold all of the network connection queues (block 64). The HOLD primitive holds the connection queues while the deadline of the arrived packet is checked. The network scheduler checks the deadline assigned at the user level to the arrived packet (block 66).

As well as checking the deadline of the arrived packet, the deadline of the arrived packet is compared to the deadline of the packet at the head of the queue with the earliest deadline (block 68). If the deadline of the queue is earlier than the deadline of the arrived packet (block 72), the queue is released using the RELEASE primitive (block 74). After releasing the queue, the deadline of the arrived packet is compared to the deadline of the queue with the next earliest deadline (block 68). The actions in block 68, 72, and 74 are repeated until the deadline of the arrived packet is earlier than the deadline of the next queue. Since the deadline of the queue is later than the deadline of the arrived packet (block 72), the arrived packet is inserted to an unassigned queue (block 76) and a new packet is checked for (block 62).

If no new packets have arrived (block 62), the next held queue is checked in order deadlines beginning with the earliest deadline (block 78). The network scheduler issues a RELEASE primitive for the queue having the earliest deadline (block 80) and the network scheduler again checks for the arrival of a new packet (block 62).

An example embodiment of a method of performing deadline based scheduling has been described by reference to FIG. 3. One skilled in the art will recognize that a data structure maintains an ordered list of the queues (maintained in deadline order) for the example embodiment listed in FIG. 3. When a new packet is assigned to a queue or when a queue is released, the data structure is updated according to any means of checking, updating or re-ordering such a data structure.

Figure 4:
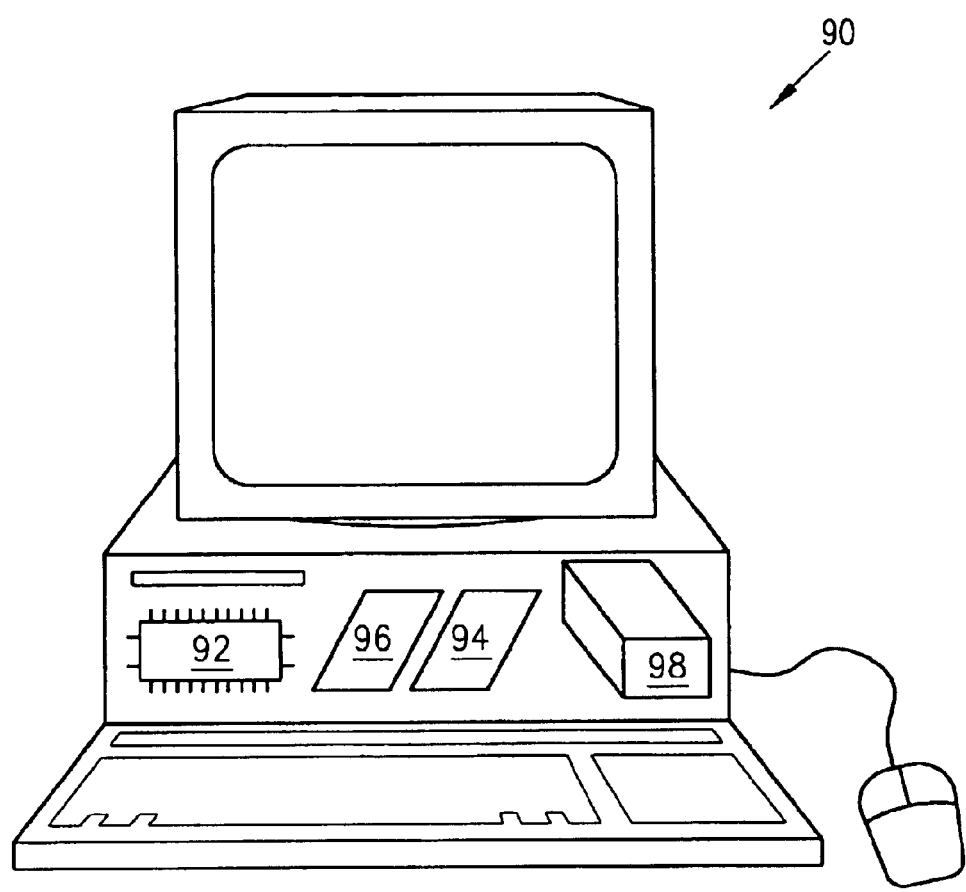
FIG. 4 is a diagram of a computerized system in conjunction with which example embodiments of the invention may be implemented.

Hardware and Operating Environment. FIG. 4 is a diagram of a computerized system in conjunction with which example embodiments of the invention may be implemented. Computer 90 includes a processor 92, random-access memory (RAM) 94, read-only memory (ROM) 96, and one or more storage devices 98, such as a hard disk drive, a floppy disk drive (into which a floppy disk can be inserted), an optical disk drive, a tape cartridge drive and the like. RAM 94 and ROM 96 are collectively referred to as the memory of computer. The memory, hard drives, floppy disks, and the like, are types of computer-readable media. The computer-readable media store instructions for execution by the processor 92. The instructions are provided to the processor 92 over a bus. The invention is not particularly limited to any type of computer 90. The construction and operation of such computers are well known within the art.

In one embodiment, the network scheduler is incorporated into software executing on a computer, such as the computer 90. As described above, the software program guarantees correct scheduling order according to the user specified priorities or deadlines. The software program is developed using any high level language. In an example embodiment, the software is developed using the C++ programming language. In one embodiment, the software executes under an operating system such as Solaris 2.5 or the like and executes on an industry-standard workstation such as a Sun SPARCstation 20 or the like connected on a Fore Systems ATM (Asynchronous Transfer Mode) LAN.

Those skilled in the art will recognize, however, that other comparable hardware and operating systems may be employed without diverting from the scope of the present invention. For example, the network scheduler may be employed with any operating system having different scheduling domains at the user level and at the kernel level as well as different methods of priority implementations and servicing of threads within the user domain and the kernel domain.

An alternate embodiment of the network scheduler of the present invention is implemented in a distributed block based programming environment such as described in a co-assigned US patent application Ser. No. 09/224,367 filed on Dec. 31, 1998, entitled "System for Constructing and Distributing Block-Based Program Fragments". The section of that co-assigned application entitled "Distributed Block-Based Application Programming Model" and the section entitle "System Overview" are herein incorporated by reference. In one embodiment, the network scheduler of the present invention operates as a system-level block in such a distributed block-based application programming model.

Figure 5:
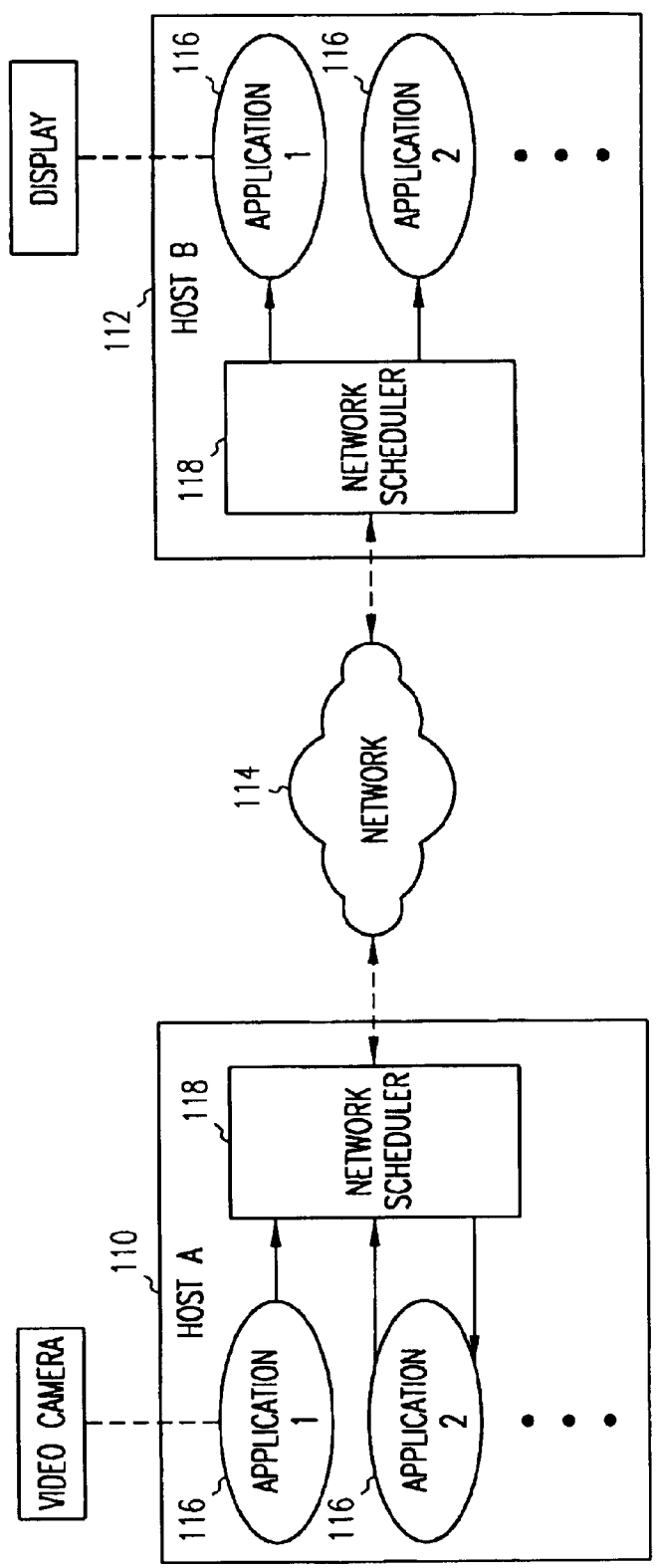
FIG. 5 is a diagram of an example embodiment of a computer system incorporating a network scheduler block

FIG. 5 is a diagram of an example embodiment of a computer system incorporating a network scheduler block according to a block based programming model. The computer system of FIG. 5 comprises two computers 110, 112, connected to a network 114. One or more distributed block based application programs 116 run on the computer. A network scheduler block 118 uses primitives, such as the primitives described earlier, to excercise control over operating system threads responsible for scheduling the release of network packets. As shown in FIG. 5, each computer 110, 112 (or processing node) has a network scheduler block acting as a proxy scheduling mechanism between the boundaries of different scheduling domains. The computer system of FIG. 5 executes a distributed multimedia control application for displaying images recorded by a video camera on a display.

Figure 6:
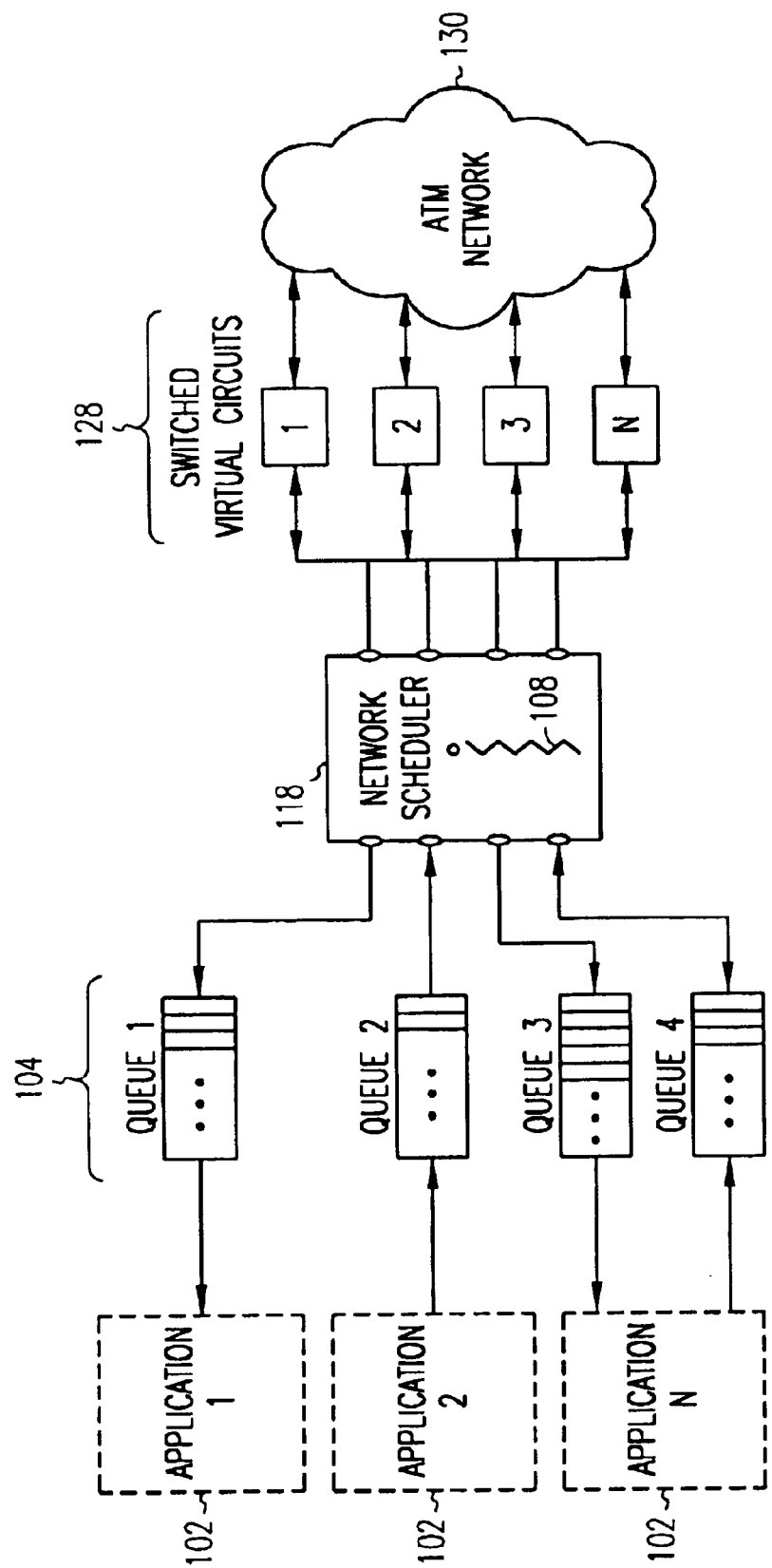
FIG. 6 is a more detailed diagram of an example embodiment of a computer system incorporating a network scheduler block.

FIG. 6 is a more detailed diagram of an example embodiment of a computer system incorporating a network scheduler block 118. In FIG. 6, the network scheduler block 118 acts as a proxy scheduler for packets on an ATM network 130. As shown in FIG. 6, one or more distributed block based appliation programs 102 execute on a computer or processing node. Network communication packets associated with the application programs 102 are held in one or more queues 104. The network scheduler block 118 preserves scheduling attributes specified by the application programs 102. In the example embodiment shown in FIG. 6, the network scheduler block 118 schedules packets for a switched virtual circuit 128 over the ATM network 130.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is aimed is:

1. A method of scheduling the use of a resource of a computer system, the method comprising:

receiving a scheduling constraint for a user-level thread; and managing the scheduling of a corresponding kernel-level thread based on the scheduling constraint of the user-level thread wherein the act of managing the scheduling of the kernel-level thread further comprises issuing one or more primitives to control scheduling of the kernel-level thread, the one or more primitives selected from the group consisting of: hold, release, check population of queue, check deadline of packet that is at the head of the queue, and check priority of packet that is at the head of the queue.

2. A computer-readable medium having computer-executable instructions stored thereon for executing a method of scheduling network packets, the method comprising:

holding a plurality network connection queues;

checking a deadline of a first one of the queues;

comparing the deadline of the first one of the queues to a deadline of a new network packet;

releasing the first one of the queues if the deadline of the first one of the queues is earlier than the deadline of the new network packet; and assigning the new packet to a second one of the queues if the deadline of the first one of the queues is later than the deadline of the new network packet.

3. The computer-readable medium of claim 2 further comprising checking the first one of the queues to determine if the first one of the queues is populated.

4. A computer-readable medium having computer-executable instructions stored thereon for executing a method of scheduling network packets, the method comprising:

holding a plurality network connection queues;

checking a priority of a first one of the queues;

comparing the priority of the first one of the queues to a priority of a new network packet;

releasing the first one of the queues if the priority of the first one of the queues is greater than the priority of the new network packet; and assigning the new packet to a second one of the queues if the priority of the first one of the queues is less than the deadline of the new network packet.

5. The computer-readable medium of claim 4 further comprising checking the first one of the queues to determine if the first one of the queues is populated.

* * * * *